United States Patent [19]

Niks

[11] Patent Number: 4,836,531
[45] Date of Patent: Jun. 6, 1989

[54] HAND AND WRIST EXERCISING MEANS

[76] Inventor: Mikhail Niks, 1434 Fulbright Ave., Redlands, Calif. 92373

[21] Appl. No.: 180,158

[22] Filed: Apr. 11, 1986

[51] Int. Cl.⁴ ............................................. A63B 23/00
[52] U.S. Cl. ..................................... 272/67; 272/116; 272/136; 272/141; 84/467
[58] Field of Search .......................... 84/465, 467–469; 272/67, 116, 135–141, 901, 142

[56] References Cited

U.S. PATENT DOCUMENTS

| 440,837 | 11/1890 | Bonelli | 84/465 X |
| 2,720,396 | 10/1955 | Pfaus | 272/142 |
| 4,461,472 | 7/1984 | Martinez | 272/141 X |

FOREIGN PATENT DOCUMENTS 318979  2/1920  Fed. Rep. of Germany ........ 84/467

Primary Examiner—Richard J. Apley
Assistant Examiner—Franklin L. Gubernick
Attorney, Agent, or Firm—John H. Crowe

[57] ABSTRACT

A primary exerciser and cooperating accessory for use by piano players. The primary execiser has an elongate base provided with an elbow stop designed to maintain the elbow of a user in position against rearward or significant sideways movement when the exerciser is in use, and a hand rest spaced ahead of the elbow stop along the elongate base. The hand rest is relatively thin and has a flat upper side sized to permit the forward part of the user's hand to rest on it palm down with the fingers stretched out ahead and the thumb tucked under its rear edge. This hand rest is mounted to slide back and forth from a rear stop position against the resistance of a spring that normally holds it at that position. It is also provided to rotate up and down around a transverse hinge axis near its front end. Additionally, the hand rest is mounted to permit swiveling movement to the right or left around a pivot point in its front portion. The accessory is fitted with spring-loaded keys and is designed for removable mounting on the primary exerciser for purposes of exercising the fingers. The primary exerciser provides exercise of the wrist in up and down movements as well as in such movements combined with sideways movements.

14 Claims, 3 Drawing Sheets

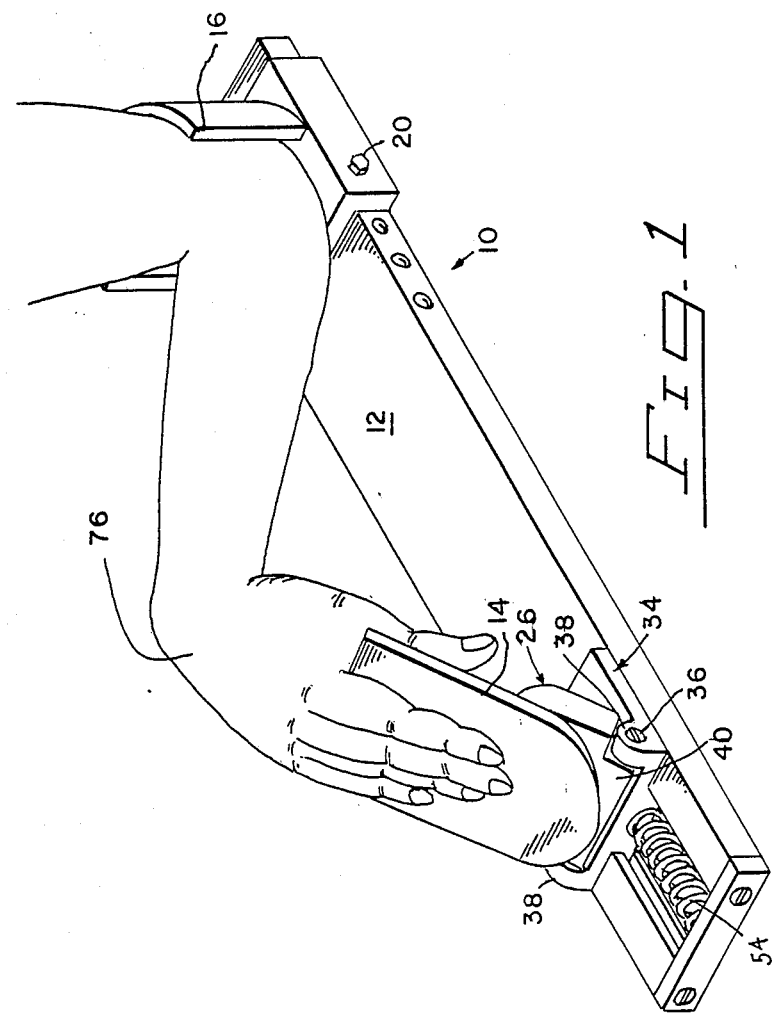

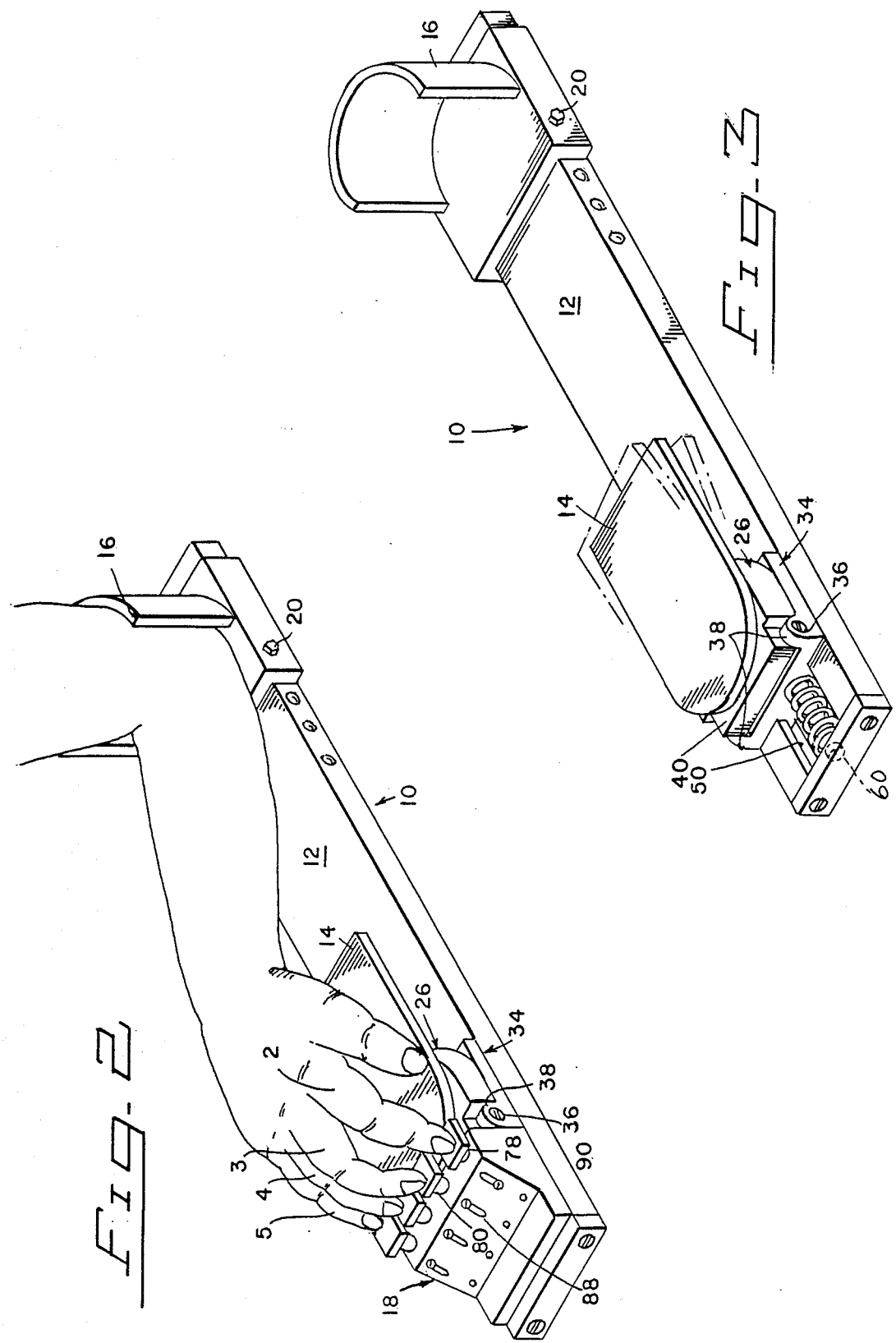

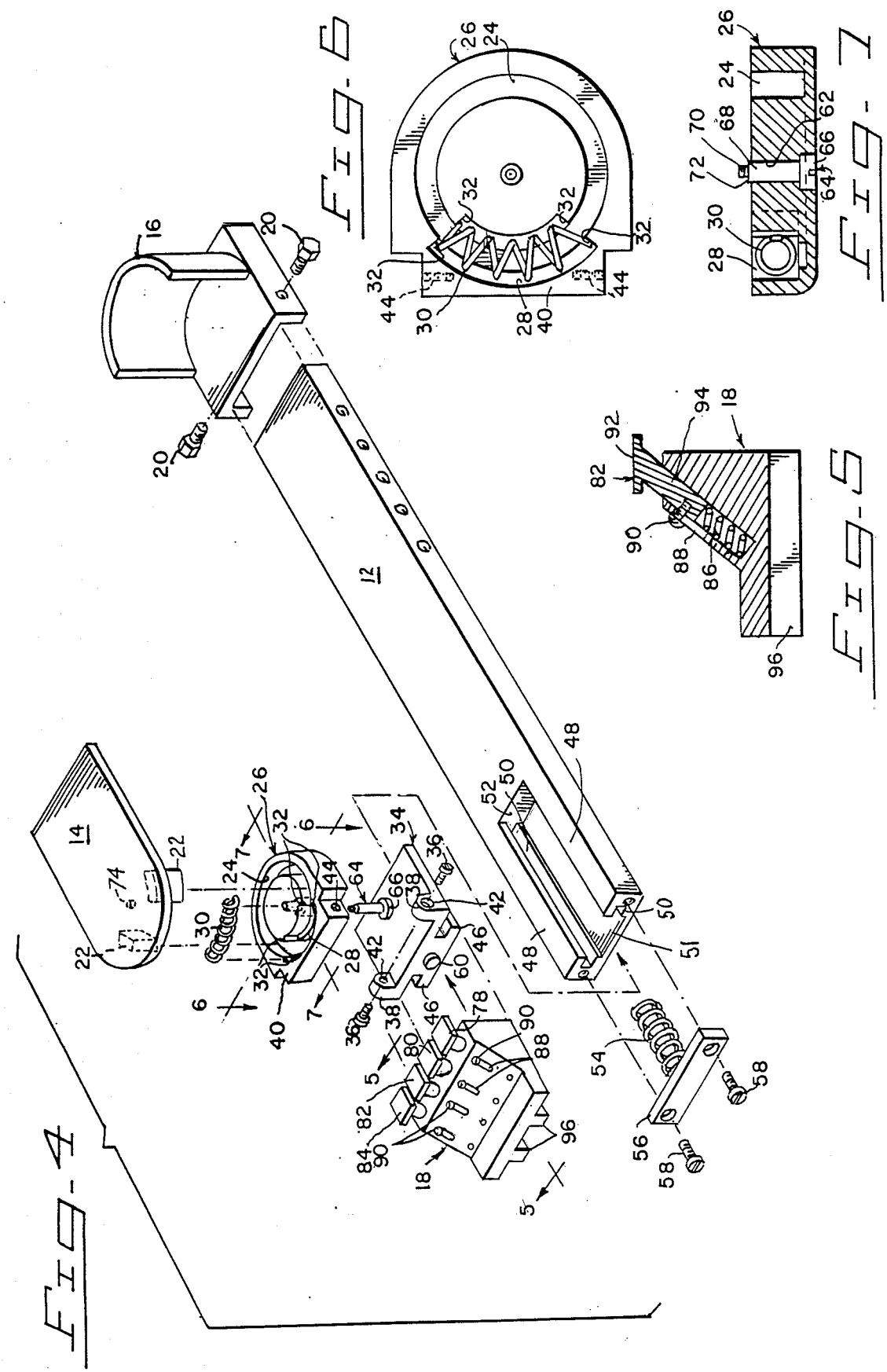

HAND AND WRIST EXERCISING MEANS

BACKGROUND OF THE INVENTION

This invention relates generally to means for exercising the hands and wrists and more particularly to such means especially useful for conditioning the fingers and wrists for piano playing without risk of injury to the hands or wrists through an improper and inefficient playing technique and with optimal quality, power and smoothness of the resulting musical sounds.

Prolonged playing of a musical instrument with a keyboard, such as the piano, with an improper technique has been known to result in injuries to the hands and wrists. such injuries are brought about by fatigue, tension and overstrained muscles occasioned by the improper technique. Such a technique is characterized by inefficient use of energy and time span and, in addition to leading to possible injury to the player, results in poor mastery of the piano or other instrument. No one has yet, to my knowledge, deviced any means of training present and future piano players to prepare them for proper playing to avoid injuries to their wrists and hands and produce high quality piano music. I have observed that many professional piano players, even concert pianists, use playing techniques that can result in hand or wrist injuries in later years. Thus, some form of exercise for such players to train their arms, wrists and fingers in a way to eliminate the risk of future injuries through reduction of the amount of physical energy expended in piano playing by the employment of a technique that subjects the wrists, fingers, etc., to minimal stress and punishment during such playing would be a boon to amateur and professional piano players alike. Such exercising means would also be helpful for those studying to play, or playing, musical instruments requiring similar movements of the hands and wrists to those required for piano playing. It would also be helpful for the retraining of pianists with injured hands, as a therapeutic aid for people with arthritic hands and as an aid in the overcombing of numbness of the hands due to to the prolonged wearing of a cast.

SUMMARY OF THE INVENTION

I have now, by this invention, provided means for exercising the wrists and fingers to condition the hands for piano playing with minimal energy expenditure and substantially no risk of injuury to the wrists and hands. To accomplish this, the exercising means includes a primary exerciser and an accessory adapted for cooperative use therewith. The primary exerciser is provided with an elbow stop design to maintain the elbow in position against rearward or significant sideways movement when the exerciser is in use, and a hand rest spaced ahead of the elbow stop. The hand rest is relatively thin and has a flat upper side sized to permit the forward part of the user's hand to rest on it palm down with the fingers stretched out ahead and the thumb hooked under its rear edge. This hand rest is mounted to slide back and forth between a rear stop and a forward position against the resistance of a spring or the like (hereinafter for the sake of brevity, referred to simply as a spring) adapted to offer such resistance. It is also pivoted to rotate up and down around a transverse hinge axis near its front end. the accessory is preferably fitted with spring-loaded keys and it is designed for removable mounting on the primary exerciser for purposes of exercising the fingers in a manner hereinafter described.

The exercising means of this invention has a threefold purpose. One form of exercise made possible thereby conditions the wrist of the user for substantially injury-free approach to up and down movements. For this exercise, the user places his elbow at the elbow stop and stretches his forearm forwardly toward the hand rest. He then rests the fingers of his hand, with the palm turned down, on the hand rest and hooks his thumb around its rear edge, all as described above. The elbow stop can be positonally adjustable to accommodate the user's forearm with the hand rest and hand at an angle with the horizontal, optimally in order of about 45°. In this starting position, the weight of the forearm is supported at two points, namely, at the hand rest and the elbow stop.

With the forearm and hand positioned as just described, the present exercise begins with a downward push of the hand which results in forward movement of the hand rest against the resistance of the aforesaid spring to the limit, not very great, permitted by the design of the exerciser. After this, the user relaxes his hand, permitting the spring to return to its initial position. These alternating movements are repeated a number of times, during which, the downward pushes against the spring strengthen the muscles of the wrist area. During the performance of this exercise, the elbow is held substantially stationary by a resistance to rearward or sideways movement at the elbow stop.

The above-described exercise demonstrates how the up and down movements of the wrist should be executed on keyboard instruments. It also trains the participating muscles, and it can serve as a way to retrain the injured hands of keyboard players, primarily, but not limited to, pianists, and to train and restrain the hands of many athletes. It can also serve as a therapeutic aid for people with arthritic hands and as an aid in the overcoming of numbness of the hands due to the prolonged wearing of a cast.

The second form of exercise made possible with my exercising means conditions the wrist of the user for substantially injury-free approach to sideways hand movements. To perform this exercise, the user places his elbow at the elbow stop and stretches his forearm forwardly toward the hand rest. As in the preparation for the first form of exercise, the user then rests the forward part of his hand on the hand rest with his thumb hooked around its rear edge. As in the case of the first form of exercise described above, only the exerciser proper is employed for this second exercise. Also, as in the case of that first form of exercise, the elbow stop is adjusted to accommodate the length of the user's forearm so that the hand rest and his hand are at the previously mentioned angle with the horizontal. In this position, as indicated above, the forearm of the user rests between two points of support, one at the hand rest and the other at the elbow stop. With the forearm and hand so positioned, this exercise begins with a push downardly and to one side (right or left) with the hand which results in a simultaneous forward and right or left pivoting movement of the hand rest against the resistance of a spring or the like (hereinafter referred to simply as a spring) positioned to return the hand rest to its initial position when the hand pressure on it is relaxed. The pivoting movement of the hand rest takes place around a pivot point centrally located in its front portion. After the downward and sideways movement of the user's hand is effectuated, he relaxes that hand to permit the built-in spring resistance to such movement in the exerciser to return the hand rest to its initial position. The user repeats this downward and sideways motion of the hand followed by relaxation thereof a number of times, during which he can push to one side repeatedly, and then to the other side repeatedly, or alternate between pushes first to one side and then the other. As with the first form of exercise, the user's repeated movement of his hand against the exerciser's yielding resistance to such movement results in strengthening of the muscles of the wrist area. Here again, the elbow is held substantially stationary by the resistance at the elbow stop to rearward or sideways movement thereof.

This second form of exercise demonstrates how sideways movements of the wrist should be executed on keyboard instruments. Also, as in the first form of the exercise, it conditions the participating muscles for piano playing and the like and/or serves to retrain the injured hands of players of keyboard instruments as well as the hands of many athletes. Finally, again as in the case of the first form of exercise, it serves as a therapeutic aid for people with arthritic hands and as an aid in the overcombing of numbness of the hands due to the prolonged wearing of a cast.

The third form of exercise with my exercising means makes possible substantially injury-free use of the wrists for finger movements, primarily finger movements during the playing of a keyboard instrument. For this exercise, the aforesaid accessory is employed, along with the primary exerciser. The accesory preferably has four or five spring-loaded keys, and it is designed to fit into a stationary position on the exerciser ahead of the hand rest. These keys are mounted to move in parallel paths, when in use, and at an angle to the horizontal, preferably about 40°, against spring, or other suitably yielding, resistance.

To prepare for the present exercise, the elbow is placed at the elbow stop which should be positioned so that when the forearm is extended toward the accessory the fingers can reach its keys and the palm of the hand is approximately horizontal. For this exercise, only one pair of the fingers are involved at any given time. Each one of the involved pair should be of a length sufficiently close to the length of the other one to permit proper usage of the exercising means. Numbering the fingers from the thumb toward the little finger as 1, 2, 3, 4 and 5, the pairs of fingers involved at any given time can be, for example, fingers 2 and 3, 3 and 4 or 1 and 5. The keys of the accessory can be numbered to correspond with the finger numbers, the numbers running in respectively opposite directions for the left and right hand. To start the exercise, one of the two fingers for that phase should approach the appropriate key and then depress that key against its yielding resistance. If, for example, fingers 2 and 3 are employed at this point, finger 2 can approach key number 2 for that hand. The positin of the elbow stop should be such that finger number 2 straightens out as it depresses key number 2 to form an angle with the horizontal approximately the same as the angle of travel of that key. During this phase of the exercise, the forearm, hand and wrist rest on two points of support, one at the elbow stop and the other at key number 2 of the accessory device, which accounts for the depression of that key. concurrently, finger number 3 should be resting on key number 3 without depressing it. this can be considered the initial position for this exercise.

Assuming fingers 2 and 3 are in the positions just described, the exercise continues with the depression of key number 3 by finger number 3, using the weight of the forearm, the hand and the wrist for this depression. Now the forearm, hand and wrist rest on three points of support: the elbow, finger number 2 and finger number 3. Next, finger number 2 is relaxed and that key returns it to its initial position with finger number 3 remaining as a support. This procedure can be repeated for fingers 2 and 3 and for all of the fingers in any sequence of finger pairs and fingers of each pair as long as desired. The spring or other yeilding resistance to the finger movements makes the exercise possible by returning the relaxed fingers to their relaxed positions, and strengthens the finger muscles without causing injury to the wrist area. The exercise trains the player of a keyboard musical instrument in the proper method of shifting weight from one finger to another. As in the case of the other forms of exercise, it trains the participating muscles and/or serves as a way to retrain the injured hands of such players, again, primarily, but not always, pianists. Also, as in the other forms of the exercise, it serves as a therapeutic aid for people with arthritic fingers and as an aid in the overcoming of numbness of the fingers due to the prolonged wearing of a cast. With an accessory having four keys the exercise can be modified accordingly.

The three exercises just described have a major principle in common, that being the principle of applying the weight of the forearm, hand and wrist to selected points of support without risk of injury to the user of the exerciser. My exercising means is designed in a way to condition one to perform only movements of the hands, wrists and fingers consistent with this principle and conducive to the results taught herein.

It is thus a principle object of this invention to provide means for exercising the wrists of a player or student of a keyboard musical instrument to condition the user for performance with minimal energy expenditure and the avoidance of long term usage of injurious playing techniques.

It is another object of the invention to provide such exercising means for conditioning the fingers of a player of a keyboard musical instrument for maximum performance capability and minimal energy input and with substantially no risk of long term injury thereto.

Other objects, features and advantages of the invention will become apparent in the light of the following description.

BRIEF DESCRIPTION OF THE DRAWINGS

FIG. 1 is an isometric view of a primary exerciser in accordance with this invention, part of a user's arm being shown in starting position thereon for either of two forms of exercise permissible therewith.

FIG. 2 is an isometric view of the primary exerciser with a finger exercising accessory mounted on it and showing part of the arm of a user in a finger exercising position thereon.

FIG. 3 is an isometric view of the primary exerciser with a hand rest member thereon being shown in phantom line illustration of positions of transverse swivel from its normal position to permit one form of exercise with the exerciser.

FIG. 4 is an exploded view of a second embodiment of the primary exerciser and cooperating finger exercising accessory.

FIG. 5 is a cross-sectional view of the finger exercising accessory, taken along line 5—5 of FIG. 4.

FIG. 6 is a top plan view of a key component of the primary exerciser taken along line 6—6 of FIG. 4 but including a spring shown exploded away therefrom in the latter figure.

FIG. 7 is a cross sectional view of the FIG. 6 part and spring, taken mostly along line 7—7 of FIG. 4.

DESCRIPTION OF PREFERRED EMBODIMENTS

Considering now the drawings in greater detail there is shown at 10 in FIG. 1 through 3 a primary exerciser in accordance with this invention. Exerciser 10 includes an elongate base 12, a hand rest 14 and an elbow stop 16. FIG. 2, shows exerciser 10 with a cooperating finger exerciser accessory 18, to be described in greater detail below, mounted thereon. FIG. 4 shows an embodiment of a primary exerciser and cooperating finger exercising accessory in accordance with this invention in exploded relationshp. While the exerciser there shown differs slightly from the exerciser of FIG. 1 through 3 in minor dimensional and other details, the two are otherwise so similar that like parts in the two embodiments ae herein designated by like reference numerals. As will be evident, elbow stop 16 is positionally adjustable along the base 12 to accommodate differing arm lengths by means of a pair of set screws 20.

The hand rest 14 is a flat member with a pair of dependent appendages 22 shaped and positioned to ride in a circular groove 24 in an underlying part 26 having a shallower, arcuate groove 28 for a curved spiral spring 30 superimposed on groove 24. The arcuate groove 28 has the same medial radius as the groove 24, but is of greater width than the latter so as to form a pair of shoulders 32 at each end. These shoulders confine the spiral spring 30 within groove 28. The dependent appendages 22 are normally confined to that part of groove 24 outboard of shoulders 32 at each end. These shoulders confine the spiral spring 30 within groove 28. The dependent appendages 22 are normally confined to that part of groove 24 outboard of shoulders 32, but when the flat hand rest 14 is swiveled to the right or left at its rear (around a pivot and for a purpose soon to be described), this brings one or the other of the appendages into the arcuate groove 28 area to compress the spring 30. The spring offers resistance to such swiveling movement of the hand rest and figures importantly in one form of exercise with exerciser 10, as will be seen.

The underlying part 26 of exerciser 10 rests on a sliding member 34 and is hingedly secured to that member to tilt upwardly therefrom around a transverse axis at its front end defined by a pair of screws 36. To achieve this hinge connection, sliding member 34 has a pair of upstanding ears 38 and the underlying part 26 is cut away at its two forward corners to leave a transversely reduced segment 40 sized to fit loosely into the space between these upstanding ears. The ears 38 are provided with smooth countersunk coaxial bores 42 and reduced transverse segment 40 of the underlying part 26 has a pair of tapped bores 44 adapted to receive the screws 36, which pass freely through the bores 42 in ears 38 and into threaded engagement with the tapped bores 44 to secure the underlying part 26 so that it is moveable around the transverse axis defined by screws 36. This permits upward tilting of the hand rest 14 about that axis durng use of exercising device 10. To make such tilting movement possible, the upstanding ears 38 of sliding member 34 are rounded at their upper ends.

Sliding member 34 has a reduced base which widens at the bottom to form a pair of parallel flanges 46 extending outwardly in opposite directions therefrom. The elongate base 12 terminates at its forward end in a pair of spaced apart prongs 48 having a pair of confronting grooves 50 integral with a floor 51 for the space between the prongs (see FIG. 4). Sliding member 34 is mounted on elongate base member 12 with the flanges 46 at its bottom slidably disposed in the grooves 50 in prongs 48. This mating interfit of parts permits sliding movement of the sliding member 34 forwardly from a rear position, where it abuts against a stop 52 formed at the base of prongs 48 in elongate base 12, against the resilient pressure of a spiral spring 54. This spiral spring is confined, under some compression, in a space between the forward end of sliding member 34 and an end closure 56 secured to the forward end of elongate base 12 by a pair of screws 58. Sprial spring 54 is axially parallel with the prongs 48 and maintained in position by means of a pair of identical locating studs 60, one on end closure 56 (shown in phantom lines in FIG. 3) an the other on sliding member 34.

The underlying part 26 has a smooth countersunk bore 62 running vertically upwardly therethrough. This bore is adapted to receive a bolt 64 with an enlarged slotted head 66 and a smooth shaft 68 terminating in a threaded portion 70 of reduced diameter which extends upwardly from a shoulder 72. The smooth shaft 68 is of a length to position shoulder 72 slightly above the top surface of the underlying part 26 (see FIG. 7). In the assembled exerciser, the bolt 64 is screwed into a threaded opening 74 runing up from the bottom and part way through the hand rest 14. This draws the hand rest snugly down on the shoulder 72 of the bolt 64 and spaces it slightly above the top surface of underlying part 26. When the exerciser is so assembled, the dependent appendages 22 of the hand rest extend downwardly into groove 24 of the underlying part, and spiral spring 30, in slightly compressed form, is disposed in arcuate groove 28 of that part. As will be apparent, when the exerciser is so assembled, upward movement of the rear part of the hand rest 14 causes upward tilting of the hand rest and underlying part 26 about the transverse axis defined by screws 36. The hand rest and underlying part 26 move as a unit because they are fastened together with the bolt 64.

In addition to the above-described tilting movement of the hand rest 14, the hand rest can be swiveled to right or left around a pivot point centered at the axis of bolt 64. As it swivels one way or the other under the influence of force supplied to the hand rest, the dependent appendages of the hand rest move into one end or the other of the arcuate groove 28 of underlying part 26 and compress the spiral spring 30. When the force is relaxed, the spring return the hand rest to its normal position in parallel alignment with the elongate base 12. FIG. 3 illustrates, in phantom lines, the nature of this swiveling movement of the hand rest around its pivot point.

FIG. 1 illustrates the starting position of the right hand 76 and forearm of a person using the primary exerciser for the first form of exercise described above. As will be clear from that figure, the elbow stop 16 is positioned so that the user's hand 76 grasps hand rest 14 with the thumb underneath the hand rest and the fingers extending downwardly along its upper side at an angle to the horizontal. As previously indicated, this angle is preferably about 45° for most people, but it can vary therefrom to an angle most comfortable for the individual user. In performing the present form of exercise, the user presses down on the hand rest 14 which results in forward motion of the sliding member 34 against the resistance of spring 54. Then, the user relaxes his hand to permit the spring to return the hand rest to its FIG. 1 position. Repetition of this downward push and relaxation of the user's hand constitutes the first form of exercise heretofore described.

For the second form of exercise described above, the hand and arm of the user assume the starting position illustrated in FIG. 1 and he or she repeats the alternate downward push and relaxation technique of the first form of exercise, but additionally urges hand rest 14 to the right or left with each downward push thereof. As the user does this, the hand rest is caused to swivel to the right or left around the above-noted pivot point. This is repeated in any desired pattern of transverse or sideways movements of the user's hand, in the manner previously described for this second form of exercise. FIG. 3 illustrates the two swiveling movements of the hand rest during this procedure by means of phantom lines, although it will be understood that the hand rest will be angled in the manner illustrated in FIG. 1 during the actual peformance of the exercise.

FIG. 2 illustrates the third form of exercise for which my exercising means was designed which, as previously indicated, is for finger exercising purposes. For this purpose, primary exerciser 10 is fitted with the finger exercising accessory 18. The accessory 18 has four spring-loaded keys 78, 80, 82 and 84 mounted in four slanting passageways, each passageway being provided with an identical spring, one such being illustrated in section at 86 in FIG. 5. Each of these passageways has a frontal slot 88 sized to receive the shank of a screw 90. The keys are each formed with a flat top and an angled shaft which extends down into one of the slanting passageways in accessory 18, the top and shaft of key 82 being shown at 92 and 94, respectively, in FIG. 5. One of the screws 90 is screwed into a tapped hole in each of the key shafts to extend outwardly through the frontal slot 88 in the passageway for that shaft (see FIG. 5). The length of each of the frontal slots is such as to permit downward travel of an associated key to the limit required for successful use of the accessory.

Accessory 18 is designed to fit onto primary exerciser 10 ahead of sliding member 34 and member 26, as illustrated in FIG. 2. It is formed with a pair of parallel ribs 96 on its underside spaced to fit down into the gap between the prongs 48 of elongate base 12 either side of spring 54. With the accessory 18 so positioned, the user placed his or her forearm on the primary exerciser with the elbow at elbow stop 16 and the hand extending over the hand rest 14, but not in contact therewith. The position of the elbow stop for this exerciser is such that the palm of the user's hand is roughly horizontal and the fingers of that hand (excluding the thumb) extend downwardly toward the four keys of accessory 18. As previously described, two of the fingers at a time are exercised by first pressing one of the keys down with one of these two fingers while the other one is lightly resting on another key. When the key being depressed is at its lower limit of travel, the finger pushing it is at an angle with the horizontal approximately the same as the angled shaft of the key, that angle typically being about 40° as previously indicated. In FIG. 2, the user's fingers are numbered from the index to the little finger as 2, 3, 4 and 5. As that figure shows, fingers 2 and 3 are being exercised, finger 2 exerting pressure on key 78 and finger 3 resting on key 80 without depressing it. Fingers 4 and 5 are out of contact with any of the accessory keys. After fingers 2 and 3 have assumed their FIG. 2 positions, finger 3 depresses key 80 and finger 2 is then relaxed. These depressing and relaxing movements of fingers 2 and 3 are continued as long as desired, after which the exercise can be repeated with another pair of fingers.

As previously indicated, my finger exercise can involve many finger sequences, but at any given time only two fingers will be actively engaged with the accessory keys. While FIG. 2 illustrates an accessory with four finger keys, it will be understood that an accessory with other than four keys can be substituted therefore if desired. For example, the finger accessory could, as already indicated, have five keys, one for each of the fingers, including the thumb. By the same token, these keys need not be in transverse alignment, as illustrated in the drawing, but can deviate therefrom within the scope of this invention. Onoe purpose of such deviation could be to make the keys more closely approximate the distal finger positions of the average person using the exerciser.

While I have herein illustrated and described the present invention in terms of reference to preferred embodiments. the invention is not limited to the features and structural details of those particular embodiments, but only by the language of the following claims.

I claim:

1. Exercising means particularly suitable for exercising the hands and wrists of keyboard instrument players, comprising:
    base means;
    elbow stop means adapted for use on said base means to prevent substantial sideways and backward movement of the elbow of one using the exercising means;
    relatively flat hand rest means adapted to receive a user's hand palm down with the thumb tucked under a rear edge, so that the hand is at a suitable angle with the horizontal for exercise of the wrist when said elbow stop means is properly positioned for this;
    supporting means for said hand rest mens slidable on said base means between a rearmost position thereon in spaced apart relationship with said elbow stop means, and a forwardly disposed position spaced farther away than said rearmost position from said elbow stop means;
    hinge means hingedly connecting said hand rest means and said supporting means so as to permit upward tilting movement of the hand rest means about a transverse hinge axis at the distal end of the hand rest means relative to said elbow stop means;
    resilient means in contact with said base means and said supporting means in a manner to normally urge said supporting means to said rearmost position and yieldably resist forward movement thereof toward said forwardly disposed position;
    said exercising means serving to permit a user to position an elbow at said elbow stop means, extend the forearm forwardly toward said hand rest means and place the hand with the fingers extending straight ahead on top of said hand rest means with the thumb hooked around its rear edge and under it to position the hand at said suitable angle with the horizontal, whereby the user can repeatedly press downwardly on the hand rest means against the yieldable resilient means then relax the hand to permit the resilient means to return said slidable means to said rearmost position for wrist exercising purposes.

2. Exercising means in accordance with claim 1 in which said base means is of elongated form and said supporting means is slidably mounted thereon to travel longitudinally between said rearmost position and said forwardly disposed position.

3. Exercising means in accordance with claim 2 in which said elbow stop means is positionally adjustable along the base means of elongated form to accommodate users of different forearm lengths.

4. Exercising means in accordance with claim 3 in which said resilient means comprises spring means.

5. Exercising means in accordance with claim 1 in which said hand rest means comprises flat upper member means to receive said user's hand plam down, underlying part means and pivot means pivotally interconnecting said flat upper member means and said underlying part means whereby said flat upper member means is pivotable with respect to said underlying part means around a forward pivot point whereby a user can push said hand rest means downwardly and concurrently swivel it to the right or left while grasping it with the palm down, at said suitable angle, and the thumb tucked under its rear edge, and with the user's elbow confined against rearward movement by said elbow stop means, said exercising means also including second resilient means disposed between and in pressing contact with said flat upper member means and said underlying part means to maintain said flat upper member means in a normal center position and yieldably resist pivoting of that member to either side and to return it to a center position when said user relaxes his sideways pressure thereon.

6. Exercising means in accordance with claim 4 in which said hand rest means comprises flat upper member means to receive said user's hand palm down, underlying part means and pivot means pivotally interconnecting said flat upper member means and said underlying part means whereby said flat upper member means is pivotable with respect to said underlying part means around a forward pivot point whereby a user can push said hand rest means downwardly and concurrently swivel it to the right or left while grasping it with the palm down, at said suitable angle, and the thumb tucked under its rear edge, and with the user's elbow confined against rearward movement by said elbow stop means, said exercising means also including second resilient means disposed between and in pressing contact with said flat upper member means and said underlying part means to maintain said flat upper member means in a normal center position and yieldably resist pivoting of that member to either side and to return it to a center position when said user relaxes his sideways pressure thereon.

7. Exercising means in accordance with claim 6 in which said second resilient means comprises spring means.

8. Exercising means in accordance with claim 1 including finger exercising means adapted for use on said base means ahead of said hand rest means, said finger exercising means including a plurality of keys each adapted to move in an inclined path against yielding resistance whereby a user with an arm positioned on said base means with the palm of the hand over said hand rest means and the elbow at said elbow stop means can press downwardly on a separate one of said keys with a separate one of said fingers until that finger is substantially straight and at substantially the same angle with the horizontal as the angle of said inclined path, and whereby release of finger pressure on that key causes said yielding resistance to return it to its original position.

9. Exercising means in accordance with claim 7 including finger exercising means adapted for use on said base means ahead of said hand rest means, said finger exercising means including a plurality of keys each adapted to move in an inclined path against yielding resistance whereby a user with an arm positioned on said base means with the palm of the hand over said hand rest means and the elbow at said elbow stop means can press downwardly on a separate one of said keys with a separate one of said fingers until that finger is substantially straight and at substantially the same angle with the horizontal as the angle of said inclined path, and whereby release of finger pressure on that key causes said yielding resistance to return it to its original position.

10. Exercising means in accordance with claim 9 in which said yielding resistance comprises spring means.

11. Exercising means in accordance with claim 10 in which said finger exercising means is removably attachable to said base means of elongated form.

12. Exercising means in accordance with claim 11 in which said suitable angle is an angle of about 45° with the horizontal.

13. Exercising means in accordance with claim 12 in which the angle of said inclined path with the horizontal is approximately 40°.

14. Exercising means in accordance with claim 13 in which said plurality of keys comprises four keys.

* * * * *

UNITED STATES PATENT AND TRADEMARK OFFICE
CERTIFICATE OF CORRECTION

PATENT NO. : 4,836,531

DATED : June 6, 1989

INVENTOR(S) : MIKHAIL NIKS

It is certified that error appears in the above-identified patent and that said Letters Patent is hereby corrected as shown below:

In the Abstract, line 2, "execiser" should read --exerciser--; and line 14, "provided" should be --pivoted--. Column 1, line 22, change "deviced" to --devised--; line 54, "design" should be --designed--; and line 67, "the" should be --The--. Column 2, line 12, "positonally" should be --positionally--; line 14, insert --the-- before "order"; line 36, "restrain" should be --retrain--; and line 60, "downardly" should be --downwardly--. Column 3, line 32, change "accesory" to --accessory--; line 60, "positin" should be --position--; and line 67, "concurrently" should be --Concurrently--. Column 4, line 14, "yeilding" should be --yielding--. Column 5, line 27, change "ae" to --are--; and lines 39-42, cancel "These shoulders confine the spiral spring 30 within groove 28. The dependent appendages 22 are normally confined to that part of groove 24 outboard of shoulders 32 at each end.". Column 6, line 22, change "Sprial" to --Spiral--; line 25, change "an" to --and--; and line 59, change "return" to --returns--. Column 7, line 56, "placed" should be --places--. Column 8, line 25, change "Onoe" to --One--; and line 49, change "mens" to --means--.

Signed and Sealed this

Twenty-seventh Day of March, 1990

*Attest:*

JEFFREY M. SAMUELS

*Attesting Officer*     *Acting Commissioner of Patents and Trademarks*